US006985639B1

(12) United States Patent
Alwar et al.

(10) Patent No.: US 6,985,639 B1
(45) Date of Patent: Jan. 10, 2006

(54) METHOD FOR QUANTIFYING RELATIVE ACCURACY OF DATABASE SEGMENTS

(75) Inventors: Narayanan Alwar, Bloomingdale, IL (US); Rajashri Joshi, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 612 days.

(21) Appl. No.: 10/133,796

(22) Filed: Apr. 26, 2002

(51) Int. Cl.
*G06K 9/36* (2006.01)
(52) U.S. Cl. .................. 382/286; 382/104; 382/151; 382/203
(58) Field of Classification Search ............... 382/286, 382/153, 104, 203, 151
See application file for complete search history.

(56) References Cited

U.S. PATENT DOCUMENTS

| | | | |
|---|---|---|---|
| 4,144,571 A | | 3/1979 | Webber |
| 5,065,348 A | | 11/1991 | Kuragano et al. |
| 5,438,517 A | | 8/1995 | Sennott et al. |
| 5,470,233 A | | 11/1995 | Fruchterman et al. |
| 5,497,451 A | | 3/1996 | Holmes |
| 5,546,107 A | * | 8/1996 | Deretsky et al. ......... 707/104.1 |
| 5,566,288 A | | 10/1996 | Koerhsen |
| 5,590,261 A | * | 12/1996 | Sclaroff et al. ............. 345/473 |
| 5,621,817 A | * | 4/1997 | Bozinovic et al. .......... 382/189 |
| 5,742,924 A | | 4/1998 | Nakayama |
| 6,029,173 A | | 2/2000 | Meek et al. |
| 6,088,663 A | | 7/2000 | Wang |
| 6,138,084 A | | 10/2000 | Mine |
| 6,263,089 B1 | | 7/2001 | Otsuka et al. |
| 6,532,304 B1 | * | 3/2003 | Liu et al. .................... 382/203 |
| 6,636,217 B1 | * | 10/2003 | Hill ............................ 345/441 |
| 6,718,062 B1 | * | 4/2004 | Zhang et al. ............... 382/218 |

FOREIGN PATENT DOCUMENTS

| | | |
|---|---|---|
| EP | 0 394 517 B1 | 6/1993 |
| EP | 0 807 803 A2 | 11/1997 |
| WO | WO 95/32483 | 11/1995 |

OTHER PUBLICATIONS

Stewart, Calculus book, 1995, "Calculus: early transcendentals". (pp. 676-679).*
Dictionary.com (pp. 1-7).*
U.S. Appl. No. 09/729,939, filed Dec. 5, 2000, entitled "Method and System for Representation of Geographic Features in a Computer-Based System".
U.S. Appl. No. 09/772,587, filed Jan. 30, 2001, entitled "Bowing Coefficient Representation of Curvature of Geographic Features".

* cited by examiner

*Primary Examiner*—Kanjibhai Patel
*Assistant Examiner*—Manav Seth
(74) *Attorney, Agent, or Firm*—Frank J. Kozak; Jon D. Shutter; Lawrence M. Kaplan

(57) ABSTRACT

A method for determining how closely two geometric shapes match is disclosed. After scaling the geometric shapes to equal length, corresponding pairs of measurement locations are determined along the linearly extending geometric shapes. Tangent vectors are determined at the measurement locations and the angle made by the tangent vectors associated with each corresponding pair of measurement locations is determined. After translating one of the geometric shapes by an angle equal to the mean of all the angles at the corresponding pairs of measurement locations, the area between the geometric shapes or the maximum deviation between the geometric shapes is determined. This is an indication of how closely the geometric shapes match. This indication can be used in various applications, including vehicle positioning, sign recognition, and evaluation of geographic database accuracy.

17 Claims, 5 Drawing Sheets

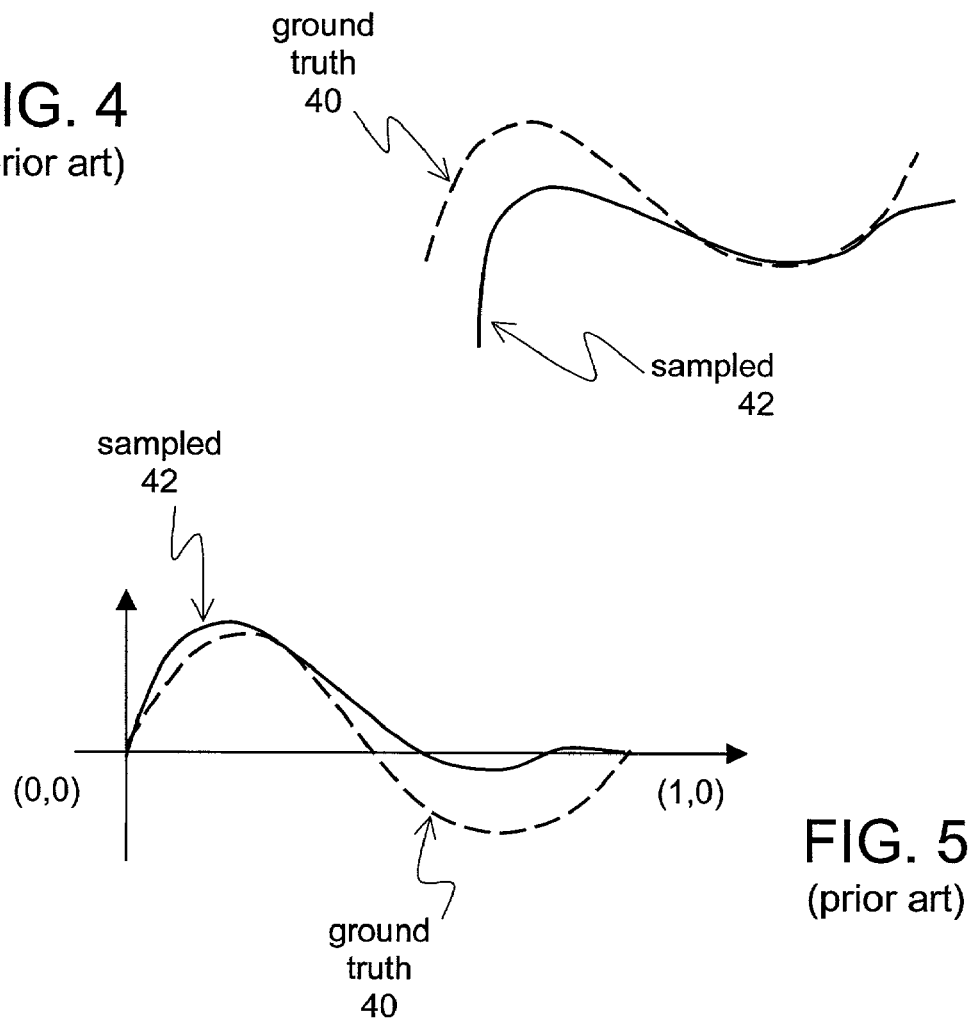
FIG. 4 (prior art)
FIG. 5 (prior art)
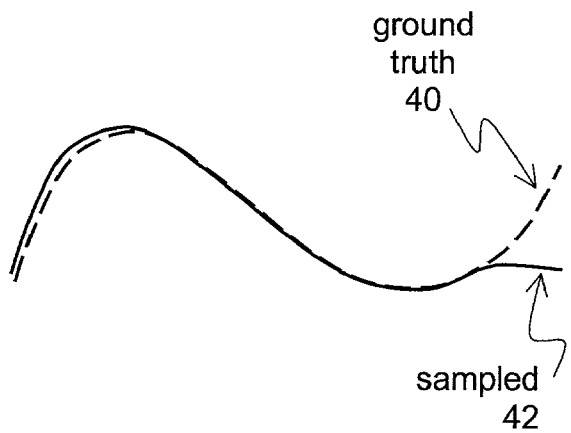
FIG. 6 (prior art)

FIG. 7A
(prior art)
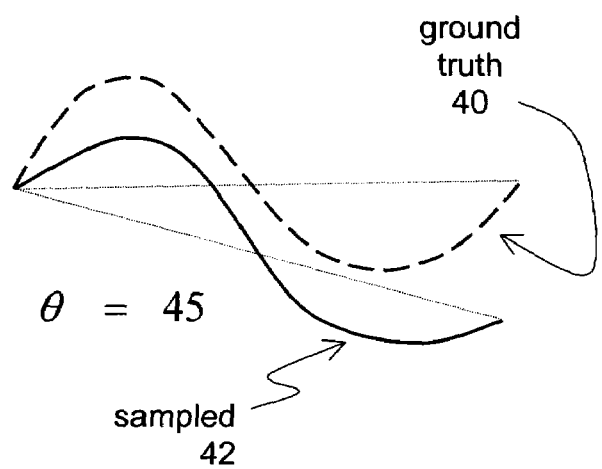
FIG. 7B
(prior art)
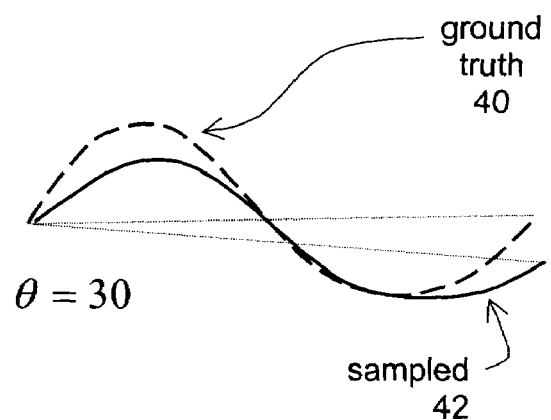
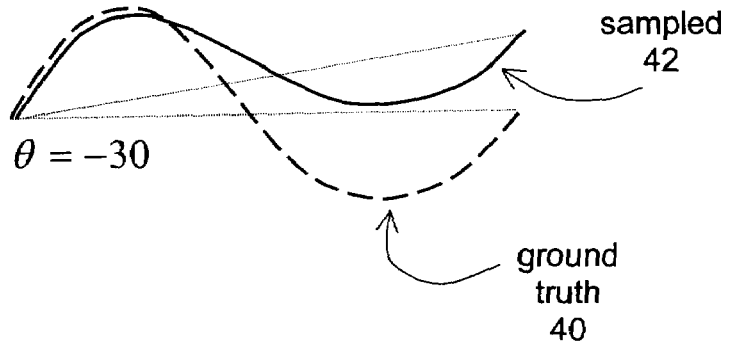
FIG. 7C
(prior art)

METHOD FOR QUANTIFYING RELATIVE ACCURACY OF DATABASE SEGMENTS

BACKGROUND OF THE INVENTION

The present invention relates to comparison of geometric shapes and more particularly, the present invention relates to a way to measure how closely one representation of a segment matches another representation of the segment.

The need to compare geometric shapes arises in various applications relating to the use of data representations of geographic features. One such application is the measurement of geographic database accuracy. Other applications include vehicle positioning and road sign recognition.

One method for measuring shape accuracy involves measuring the unsigned area between a sampled segment and a ground truth segment. Referring to FIG. 1, a ground truth segment 10 is shown as a dashed line and a sampled segment 12 is shown as a solid line. Areas between the ground truth segment 10 and the sampled segment are indicated as A1, A2, and A3. According to this method, the larger the area between the segments, the greater is the deviation between the segments.

Another method for measuring shape accuracy is to measure the maximum deviation between a sampled segment and a ground truth segment. Referring to FIG. 2, a ground truth segment 20 is shown as a dashed line and a sampled segment 22 is shown as a solid line. Note that in order to obtain a true measure of a distance between the two segments, the segments should be aligned to minimize the area. However, this method does not specify how this alignment should be carried out.

There are at least two possible approaches for aligning a sampled segment and a ground truth segment so that the relative accuracy between them can be measured. FIG. 3 shows a first approach for aligning a sampled segment and a ground truth segment. According to this approach, the segments are first scaled so that the starting and ending nodes (i.e., endpoints) of the segments coincide. As shown graphically in FIG. 3, the segments are scaled so that the starting and ending nodes correspond to (0,0) and (1,0) respectively. Then, the unsigned area between the two segments is computed. This area is a measure of the relative accuracy between the two segments.

This approach has the disadvantage that it may not always yield an accurate measure of relative accuracy because aligning the segments as shown in FIG. 3 may not be the optimal alignment that yields the minimum area. For example, consider the ground truth segment 40 and the sampled segment 42, shown in FIG. 4. These two segments have a similar shape except at one of the endpoints. When they are aligned so that their starting and ending nodes correspond to (0,0) and (1,0) respectively, as described in the first approach, the alignment shown in FIG. 5 is obtained. As shown in FIG. 5, a relatively large area exists between the two segments. The segments 40 and 42 should be aligned as shown in FIG. 6 to yield a truer measure of relative accuracy.

A second approach for aligning a sampled segment and a ground truth segment is illustrated in FIGS. 7A, 7B and 7C. According to this approach, the features are first scaled so that the starting and ending nodes of each feature correspond to (0,0) and (1,0) respectively, as in the previous approach. Then, the unsigned area or deviation between the two segments is computed. Then, the sampled segment 42 is rotated through an incremental angle $\Delta\theta$ with respect to the ground truth segment 40 and the unsigned area or deviation between the two segments is computed again. The steps of rotating and computing are repeated successively until all values of $-\pi \leq \theta \leq \pi$ have been traversed, as indicated in FIGS. 7A, 7B, and 7C. The minimum area obtained using this approach is a measure of the relative accuracy between the two segments. The accuracy of this approach is a function of the angle increment $\Delta\theta$. The smaller the angle increment, the greater is the accuracy of this approach. Although this approach yields an accurate measure of relative accuracy between a sampled segment and a ground truth segment, it is computationally intensive.

Accordingly, there exists a need for an improved way for aligning a pair of shapes in a manner which is computationally non-intensive and consistent for all segments.

SUMMARY OF THE INVENTION

To address these and other objectives, the present invention includes a method for comparing two geometric shapes to each other. After scaling the geometric shapes to equal length (if necessary), corresponding pairs of measurement locations are determined along the geometric shapes. Tangent vectors are determined at the measurement locations and the angle made by the tangent vectors associated with each corresponding pair of measurement locations is determined. After translating one of the geometric shapes by an angle equal to the mean of all the angles at the corresponding pairs of measurement locations, the area between the geometric shapes or the maximum deviation between the geometric shapes is determined. This is an indication of how closely the geometric shapes match. This indication can be used in various applications, including vehicle positioning, sign recognition, and evaluation of geographic database accuracy.

BRIEF DESCRIPTION OF THE DRAWINGS

FIG. 4 shows a sampled segment and a ground truth segment to be compared by a prior art method.

FIG. 5 shows a prior art approach for aligning the sampled segment and the ground truth segment shown in FIG. 4.

FIG. 6 shows another way to align the sampled segment and ground truth segment shown in FIG. 5.

FIGS. 7A, 7B, and 7C show another prior art approach for aligning the sampled segment and the ground truth segment shown in FIG. 4.

DETAILED DESCRIPTION OF THE PRESENTLY PREFERRED EMBODIMENTS

Figure 1:
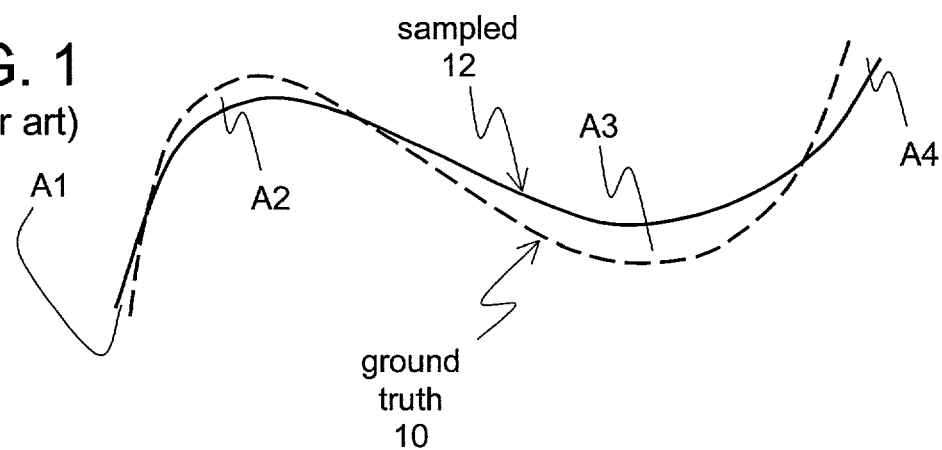
FIG. 1 shows a prior art method for describing the relative accuracy of a ground truth segment and a sampled segment.
Figure 2:
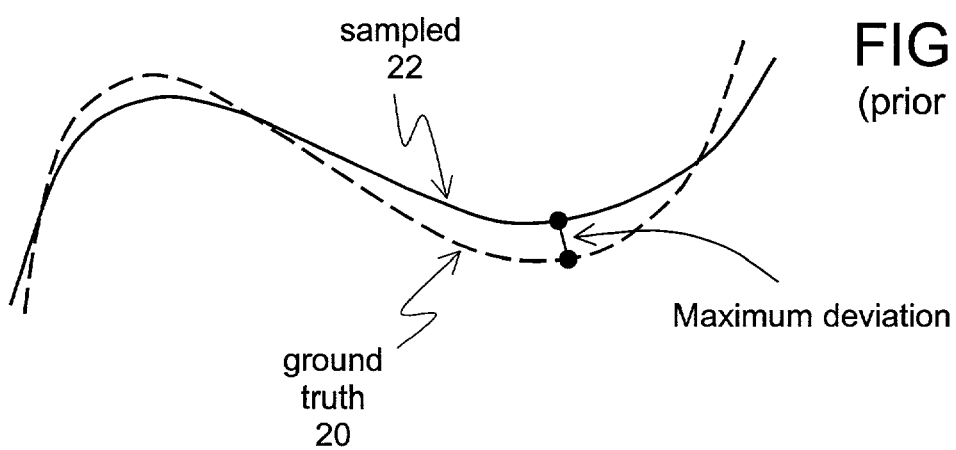
FIG. 2 shows another prior art method for describing the relative accuracy of a ground truth segment and a sampled segment.
Figure 3:
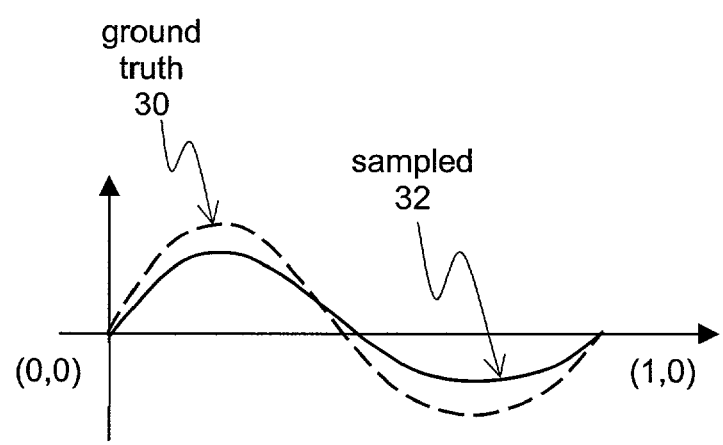
FIG. 3 shows a prior art approach for aligning a sampled segment with a ground truth segment so that the relative accuracy can be determined.
Figure 8:
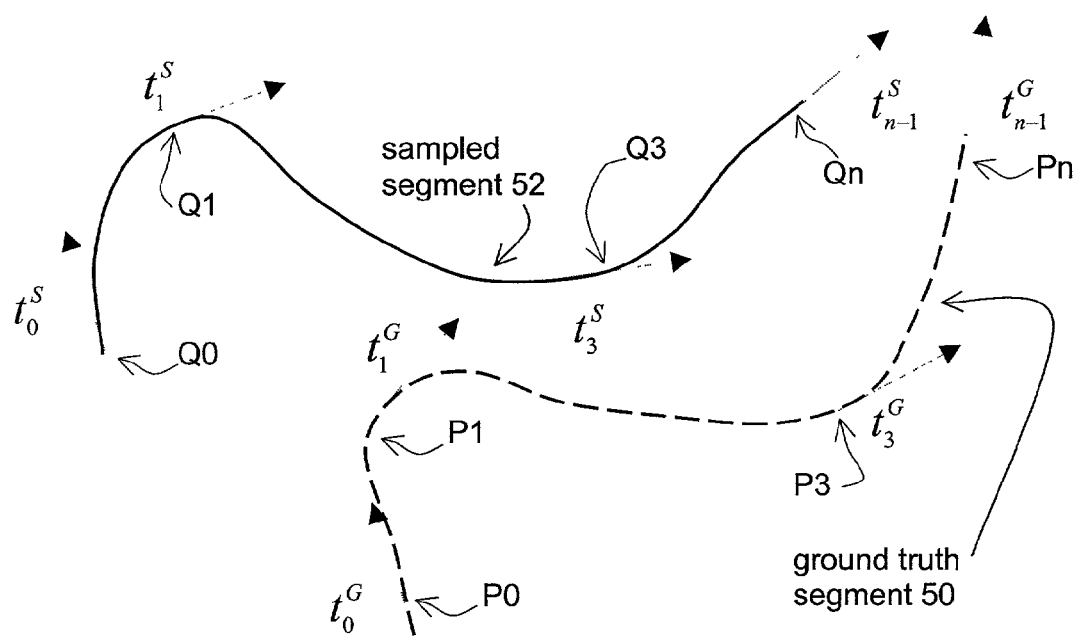
FIG. 8 illustrates a step according to an embodiment of the present invention for aligning two geometric shapes.
Figure 9:
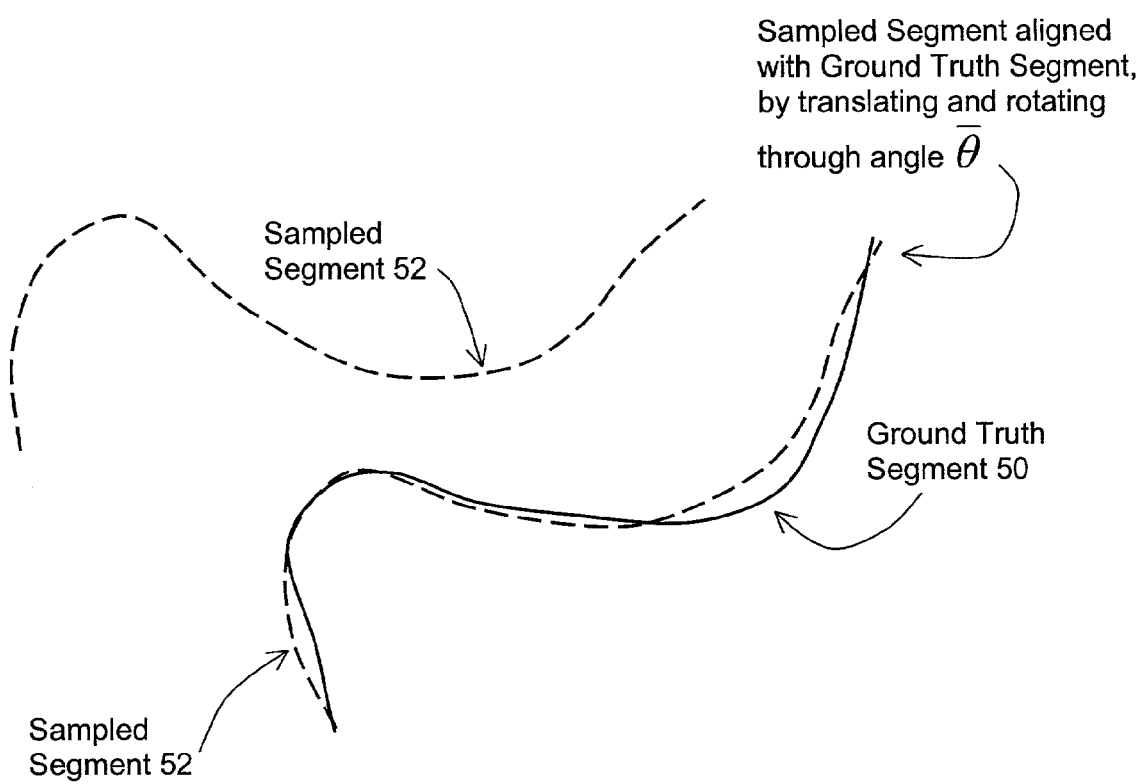
FIG. 9 illustrates another step in the embodiment shown in FIG. 8.

A present embodiment provides a consistent method for defining and assessing relative accuracy of geometric shapes and in particular, geometric shapes that are representations of road segments. FIG. 8 shows a first (or ground truth) segment 50 and a second (or sampled) segment 52. According to this embodiment, the segments 50 and 52 are scaled to a unit length (or equal length) and a nominal starting point is designated on each segment. Then, corresponding locations (P0, P1 . . . on segment 50 and Q0, Q1 . . . on segment 52) are determined along the two segments. The corresponding locations are an equal distance from their respective nominal starting points. Then, tangent vectors are computed at these corresponding locations. In FIG. 8, the tangent vectors on the ground truth segment 50 are labeled $t_i^G$ and the tangent vectors on the sampled segment 52 are labeled $t_i^S$.

The angle between each corresponding pair of tangent vectors is then computed. The angle between each pair of ground truth and sampled segment tangent vectors is defined as the angle through which the tangent of the sampled segment is rotated so that it aligns with the corresponding tangent to the ground truth segment. WLOG, a clockwise rotation is defined as positive and a counterclockwise rotation is defined as negative. The angle is given by $$\theta_i = \cos^{-1}\left(\frac{\overline{t_i^G} \cdot \overline{t_i^S}}{\|\overline{t_i^G}\|\|\overline{t_i^S}\|}\right)$$

Then, the mean of the computed angles is computed. This is given by $$\overline{\theta} = \sum_{i=0}^{n-1} \theta_i$$

Note that this angle $\overline{\theta}$ defines the mean rotation between the ground truth and sampled segments 50 and 52.

The mean rotation between the ground truth segment 50 and the sampled segment 52 can be removed by rotating the sampled segment 52 through an angle of $\overline{\theta}$ to align with the corresponding ground truth segment 52. The sampled segment 52 is then translated so that its starting point coincides with the starting point of the ground truth segment 50. Once this is done, the area between the two segments or the maximum deviation between the two segments can be determined.

This method of aligning the segments can be carried out in a consistent, intuitive way for all of the segments in a database without the need for a brute force computation.

It is intended that the foregoing detailed description be regarded as illustrative rather than limiting and that it is understood that the following claims including all equivalents are intended to define the scope of the invention.

We claim:

1. A method for aligning a first linearly extending geometric shape and a second linearly extending geometric shape so that a comparison can be made as to how closely they match, the method comprising:

scaling at least one of the linearly extending geometric shapes, if necessary, so that the first linearly extending geometric shape has a length equal to the second linearly extending geometric shape;

determining measurement locations along the first linearly extending geometric shape and corresponding measurement locations along the second linearly extending geometric shape, wherein each measurement location on the first linearly extending geometric shape is located at a specific respective distance from a nominal starting point on the first linearly extending geometric shape, wherein each measurement location on the second linearly extending geometric shape is located at a specific respective distance from a nominal starting point on the second linearly extending geometric shape, and wherein the specific respective distance of each measurement location along the first linearly extending geometric shape is equal to the specific respective distance of each corresponding measurement location along the second linearly extending geometric shape;

determining tangent vectors along each linearly extending geometric shape at each measurement location;

for each measurement location along the first linearly extending geometric shape, determining an angle between the tangent vector determined with respect to the first linearly extending geometric shape at the measurement location and the tangent vector determined with respect to the second linearly extending geometric shape at the corresponding measurement location;

computing a mean of the angles;

rotating the second linearly extending geometric shape by the mean of the angles; and translating the second linearly extending geometric shape so that one end thereof coincides with a corresponding end of the first linearly extending geometric shape, if necessary, whereby after translating the first linearly extending geometric shape and the second linearly extending geometric shape can be compared.

2. The method of claim 1 wherein the first linearly extending geometric shape and the second linearly extending geometric shape can be compared by computing an area between the first linearly extending geometric shape and the second linearly extending geometric shape.

3. The method of claim 1 wherein the first linearly extending geometric shape and the second linearly extending geometric shape can be compared by computing a maximum deviation between the first linearly extending geometric shape and the second linearly extending geometric shape.

4. The method of claim 1 wherein said first linearly extending geometric shape and said second linearly extending geometric shape are representations of the same road segment.

5. The method of claim 1 wherein one of the linearly extending geometric shapes is a sampled representation of a road segment and the other of the linearly extending geometric shapes is a ground truth representation of the road segment.

6. The method of claim 1 wherein the angle between the tangent vector determined with respect to the first linearly extending geometric shape at the measurement location and the tangent vector determined with respect to the second linearly extending geometric shape at the corresponding measurement location is given by $$\theta_i = \cos^{-1}\left(\frac{\overline{t_i^G} \cdot \overline{t_i^S}}{\|\overline{t_i^G}\|\|\overline{t_i^S}\|}\right)$$

where $t_i^G$ is the tangent vector on the first linearly extending geometric shape at a measurement location i and $t_i^S$ is the tangent vector on the second linearly extending geometric shape at the corresponding measurement location i on the second linearly extending geometric shape, and $\theta_i$ is the angle between the tangent vector determined with respect to the first linearly extending geometric shape at the measurement location i and the tangent vector determined with respect to the second linearly extending geometric shape at the corresponding measurement location i on the second linearly extending geometric shape.

7. The method of claim 1 wherein the mean of the angles is given by $$\bar{\theta} = \sum_{i=0}^{n-1} \theta_i$$

where $\theta_i$ is the angle between the tangent vector determined with respect to the first linearly extending geometric shape at each measurement location i and the tangent vector determined with respect to the second linearly extending geometric shape at the corresponding measurement location and $\theta$ is the mean of the computed angles.

8. A method of comparing a first linearly extending geometric shape and a second linearly extending geometric shape comprising:
  scaling at least one of the linearly extending geometric shapes, if necessary, so that the first linearly extending geometric shape has a length equal to the second linearly extending geometric shape;
  determining measurement locations along the first linearly extending geometric shape and corresponding measurement locations along the second linearly extending geometric shape,
  wherein each measurement location on the first linearly extending geometric shape is located at a specific respective distance from a nominal starting point on the first linearly extending geometric shape, and
  wherein each measurement location on the second linearly extending geometric shape is located at a specific respective distance from a nominal starting point on the second linearly extending geometric shape, and
  wherein the specific respective distance of each measurement location along the first linearly extending geometric shape is equal to the specific respective distance of each corresponding measurement location along the second linearly extending geometric shape;
  determining tangent vectors along each linearly extending geometric shape at each measurement location;
  for each measurement location along the first linearly extending geometric shape, determining an angle between the tangent vector determined with respect to the first linearly extending geometric shape at the measurement location and the tangent vector determined with respect to the second linearly extending geometric shape at the corresponding measurement location;
  computing a mean of the angles;
  rotating the second linearly extending geometric shape by the mean of the angles;
  translating the second linearly extending geometric shape so that one end thereof coincides with a corresponding end of the first linearly extending geometric shape, if necessary; and
  computing an area between the first linearly extending geometric shape and the second linearly extending geometric shape,
  whereby the area indicates how the second linearly extending relatively geometric shape matches the first linearly extending geometric shape.

9. The method of claim 8 wherein said first linearly extending geometric shape and said second linearly extending geometric shape are representations of the same road segment.

10. The method of claim 8 wherein one of the linearly extending geometric shapes is a sampled representation of a road segment and the other of the linearly extending geometric shapes is a ground truth representation of the road segment.

11. The method of claim 8 wherein the angle between the tangent vector determined with respect to the first linearly extending geometric shape at the measurement location and the tangent vector determined with respect to the second linearly extending geometric shape at the corresponding measurement location is given by $$\theta_i = \cos^{-1}\left(\frac{\vec{t_i^G} \cdot \vec{t_i^S}}{\|\vec{t_i^G}\|\|\vec{t_i^S}\|}\right)$$

where $t_i^G$ is the tangent vector on the first linearly extending geometric shape at a measurement location i and $t_i^S$ is the tangent vector on the second linearly extending geometric shape at the corresponding measurement location i on the second linearly extending geometric shape, and $\theta_i$ is the angle between the tangent vector determined with respect to the first linearly extending geometric shape at the measurement location i and the tangent vector determined with respect to the second linearly extending geometric shape at the corresponding measurement location i on the second linearly extending geometric shape.

12. The method of claim 8 wherein the mean of the angles is given by $$\bar{\theta} = \sum_{i=0}^{n-1} \theta_i$$

where $\theta_i$ is the angle between the tangent vector determined with respect to the first linearly extending geometric shape at each measurement location i and the tangent vector determined with respect to the second linearly extending geometric shape at the corresponding measurement location and $\theta$ is the mean of the computed angles.

13. A method of comparing a first linearly extending geometric shape and a second linearly extending geometric shape comprising:
  scaling at least one of the linearly extending geometric shapes, if necessary, so that the first linearly extending geometric shape has a length equal to the second linearly extending geometric shape;
  determining measurement locations along the first linearly extending geometric shape and corresponding measurement locations along the second linearly extending geometric shape, wherein each measurement location on the first linearly extending geometric shape is located at a specific respective distance from a nominal starting point on the first linearly extending geometric shape, wherein each measurement location on the second linearly extending geometric shape is located at a specific respective distance from a nominal starting point on the second linearly extending geometric shape, and wherein the specific respective distance of each measurement location along the first linearly extending geometric shape is equal to the specific respective distance of each corresponding measurement location along the second linearly extending geometric shape;

determining tangent vectors along each linearly extending geometric shape at each measurement location;

for each measurement location along the first linearly extending geometric shape, determining an angle between the tangent vector determined with respect to the first linearly extending geometric shape at the measurement location and the tangent vector determined with respect to the second linearly extending geometric shape at the corresponding measurement location;

computing a mean of the angles;

rotating the second linearly extending geometric shape by the mean of the angles;

translating the second linearly extending geometric shape so that one end thereof coincides with a corresponding end of the first linearly extending geometric shape, if necessary; and computing a maximum deviation between the two geometric shapes, whereby the maximum deviation indicates how the second linearly extending geometric shape relatively matches the first linearly extending geometric shape.

14. The method of claim 13 wherein said first linearly extending geometric shape and said second linearly extending geometric shape are representations of the same road segment.

15. The method of claim 13 wherein one of the linearly extending geometric shapes is a sampled representation of a road segment and the other of the linearly extending geometric shapes is a ground truth representation of the road segment.

16. The method of claim 13 wherein the angle between the tangent vector determined with respect to the first linearly extending geometric shape at the measurement location and the tangent vector determined with respect to the second linearly extending geometric shape at the corresponding measurement location is given by $$\theta_i = \cos^{-1}\left(\frac{\overline{t_i^G} \cdot \overline{t_i^S}}{\|\overline{t_i^G}\|\|\overline{t_i^S}\|}\right)$$

where $t_i^G$ is the tangent vector on the first linearly extending geometric shape at a measurement location i and $t_i^S$ is the tangent vector on the second linearly extending geometric shape at the corresponding measurement location i on the second linearly extending geometric shape, and $\theta_i$ is the angle between the tangent vector determined with respect to the first linearly extending geometric shape at the measurement location i and the tangent vector determined with respect to the second linearly extending geometric shape at the corresponding measurement location i on the second linearly extending geometric shape.

17. The method of claim 13 wherein the mean of the angles is given by $$\overline{\theta} = \sum_{i=0}^{n-1} \theta_i$$

where $\theta_i$ is the angle between the tangent vector determined with respect to the first linearly extending geometric shape at each measurement location i and the tangent vector determined with respect to the second linearly extending geometric shape at the corresponding measurement location and $\theta$ is the mean of the computed angles.

* * * * *